United States Patent
Schubert

(10) Patent No.: US 6,939,049 B2
(45) Date of Patent: Sep. 6, 2005

(54) CONNECTING ROD BEARING SHELL OR BUSHING OR MAIN BEARING SHELL

(75) Inventor: Werner Schubert, Wiesloch (DE)

(73) Assignee: KS Gleitlager GmbH, St. Leon-Rot (DE)

(*) Notice: Subject to any disclaimer, the term of this patent is extended or adjusted under 35 U.S.C. 154(b) by 140 days.

(21) Appl. No.: 10/475,308

(22) PCT Filed: Aug. 22, 2002

(86) PCT No.: PCT/EP02/09380

§ 371 (c)(1),
(2), (4) Date: Oct. 21, 2003

(87) PCT Pub. No.: WO03/023241

PCT Pub. Date: Mar. 20, 2003

(65) Prior Publication Data

US 2004/0126042 A1 Jul. 1, 2004

(30) Foreign Application Priority Data

Sep. 8, 2001 (DE) .......................... 101 44 126

(51) Int. Cl.$^7$ ................................. F16C 9/04
(52) U.S. Cl. ..................... 384/294; 384/913
(58) Field of Search ................ 384/276, 294, 384/913, 912

(56) References Cited

U.S. PATENT DOCUMENTS

| 5,045,405 A | * | 9/1991 | Koroschetz et al. ........ 384/912 |
| 5,342,698 A | * | 8/1994 | Fujisawa et al. ............ 384/912 |
| 5,911,513 A | * | 6/1999 | Tsuji et al. ................. 384/276 |
| 6,273,972 B1 | * | 8/2001 | Andler ....................... 384/912 |

FOREIGN PATENT DOCUMENTS

| CH | 22 35 80 | 9/1942 |
| DE | 44 11 762 | 10/1995 |
| DE | 197 28 777 | 4/1999 |

* cited by examiner

Primary Examiner—Thomas R. Hannon
(74) Attorney, Agent, or Firm—Paul Vincent

(57) ABSTRACT

The invention relates to a connecting rod bearing shell or bushing for internal combustion engines or to a main bearing shell for crankshaft mounting in internal combustion engines, made of a sliding bearing composite material having a metal, preferably steel support layer and a metal sliding layer applied thereto. The sliding bearing composite material is suitable for all applications cited and the sliding layer is made up of a copper zinc alloy with 10–25 wt. % Zn. 1–3 wt. % Mn. 1–3 wt. % Ni. 2–6 wt. % Fe: the remainder being copper, and impurity elements, respectively accounting for a maximum of 0.1%, corresponding to a maximum overall sum of 1 wt. % and the sliding layer is exclusively crystallised in the α-phase.

5 Claims, No Drawings

CONNECTING ROD BEARING SHELL OR BUSHING OR MAIN BEARING SHELL

This application is the national stage of PCT/EP02/09380 filed on Aug. 22, 2002 and also claims Paris Convention priority of DE 101 44 126.6 filed on Sep. 8, 2001.

BACKGROUND OF THE INVENTION

The invention concerns a connecting rod bearing shell or bushing for internal combustion engines or a main bearing shell for bearing the crankshaft of internal combustion engines, made from a sliding bearing composite material with a metallic, preferably steel, support layer, and with a metallic sliding layer disposed thereon.

Connecting rod bearing elements, i.e. connecting rod bearing shells surrounding the crank pin of a crankshaft, and connecting rod bearing bushings which surround the piston bolt and can be pressed into the small end bearing, must meet multiple requirements. On the one hand, the connecting rod bearing shells must be durable at high sliding speeds and average loads, and the connecting rod bearing bushings must be durable at high loads and higher temperatures but slower to moderate sliding speeds. The requirements for main bearing shells in crankshafts are determined by the reduced load at these locations compared to connecting rod bearing shells and the high sliding speed at relatively moderate temperatures. Main bearing shells must also be able to compensate for misalignment of the crankshaft.

The Assignee has disclosed connecting rod bearing bushings for use in the small connecting rod eye of an engine connecting rod whose sliding layer consists of a copper zinc alloy having a relatively large zinc portion of approximately 30% by weight and 2% by weight of manganese, 2% by weight of nickel, 2% by weight of aluminium and 1.8% by weight of iron.

EP 1 158 062 A1 discloses a copper zinc aluminium wroughting material and its use for producing bearing bushings for connecting rods and pistons in internal combustion engines. The material consists of 63.5 to 66.5% by weight of copper, 2.0 to 5.4% by weight of aluminium, 4.1 to 4.9% by weight of manganese, 2.6 to 3.4% by weight of iron, 1.1 to 1.9% by weight of nickel, the rest being zinc and the usual impurities. The embodiments disclose a zinc content of 20 or 22% by weight.

DE 44 11 762 A1 discloses a sliding layer composite material wherein a copper-zinc wroughting alloy having a large zinc portion of 28 to 32% by weight is roll-bonded to a support layer of steel.

DE 198 01 074 A1 discloses a sliding layer composite material with a copper zinc alloy having a proposed ratio between $\alpha$ and $\beta$ phase of 1.5 to 6.

CH 223 580 discloses copper zinc alloys, in particular for producing machine parts which are exposed to frictional loads, with 2 to 8% by weight of aluminium, 0.05 to 3% by weight of silicon, 0.5 to 10% by weight of manganese and 50 to 70% by weight of copper. Up to 10% by weight of lead and 0.1 to 5.0% by weight of iron, nickel and cobalt may be added to the alloy.

DE 197 28 777 C2 discloses a layered composite material having a carrier layer and a metal bearing layer, in particular made from a copper zinc alloy and with an electro-plated lead-free sliding layer on the basis of tin.

In view of the above, it is the underlying purpose of the present invention to produce a sliding layer composite material which is suitable for use as connecting rod bearing shell and also for use as connecting rod bearing bushing and main bearing shell for the crankshaft.

SUMMARY OF THE INVENTION

This object is achieved in accordance with the invention in that the sliding layer of the connecting rod bearing shell or connecting rod bearing bushing or main bearing shell is formed by a copper zinc alloy which comprises 10–25% by weight of Zn, 1 to 3% by weight of Mn, 1 to 3% by weight of Ni and 2 to 6% by weight of Fe, the rest being copper and impurities, each of which has a maximum of 0.1% by weight and a total impurity maximum of 1% by weight, wherein the sliding layer is crystallized exclusively in the $\alpha$ phase.

It has turned out that when the copper zinc alloy crystallizes exclusively in the $\alpha$ phase, a sliding bearing material is obtained which is suitable for the mentioned applications and which has excellent properties with regard to corrosion. $\beta$ brass tends to selectively corrode and behaves as a sacrificial anode in the metallic connecting rod. The high iron content has solidifying properties and increases the toughness of the material. It reduces the grain size and increases the re-crystallization temperature of the alloy. The iron content is preferably 3.5 to 4.5% by weight.

DESCRIPTION OF THE PREFERRED EMBODIMENT

The invention has shown that when the zinc content is limited to 25% by weight, a structure is achieved which is crystallized exclusively in the $\alpha$ phase.

Moreover, it is particularly advantageous when the sliding layer consists of the above-mentioned components or of an alloy which contains an additional 1 to 3% by weight of aluminium. Aluminium increases the strength of the inventive alloy.

It is also advantageous to form a thin overlay layer on the sliding layer, which faces the sliding partner and has an electro-plated tin layer or a tin layer with PTFE inclusions or a layer of an aluminium tin alloy sputtered onto a diffusion-blocking layer. When the overlay layer is to serve as running layer, the layer thickness is chosen to be more than 10 $\mu$m and if it is to serve merely as run-in layer, the layer thickness is selected to be <5 $\mu$m.

A preferred composition of the sliding layer of the inventive connecting rod bearing shell or connecting rod bearing bushing has a composition in % by weight of Cu(rest) Zn(19–21), Mn(1.5–2.5), Ni(1.5–2.5), Fe(3.5–4.5), Al(1.5–2.5). Particularly preferred is a sliding layer of CuZn20Mn2Ni2Fe4Al2 alloy.

What is claimed is:

1. A connecting rod bearing shell or bushing for a combustion engine or a main bearing shell for bearing the crankshaft of a combustion engine, made from a sliding bearing composite material comprising:
   a metallic support layer; and
   a metallic sliding layer disposed thereon, wherein said sliding layer has a copper zinc alloy with 10 to 25% by weight of Zn, 1 to 3% by weight of Mn, 1 to 3% by weight of Ni, 2 to 6% by weight of Fe, the rest being copper and impurities of not more than 0.1% by weight each, in total not more than 1% by weight, said sliding layer being crystallized exclusively in an $\alpha$ phase.

2. The connecting rod bearing shell or bushing for a combustion engine or main bearing shell of claim 1, wherein said metallic support layer is made from steel.

3. The connecting rod bearing shell or bushing or main bearing shell of claim 1, wherein said sliding layer further comprises a thin overlay layer, facing a sliding partner, said overlay layer being one of an electro-plated layer of tin, an electroplated layer of an alloy on the basis of tin, a tin layer with PTFE inclusions, and a layer of an aluminium tin alloy sputtered onto a diffusion-blocking layer.

4. The connecting rod bearing shell or bushing or main bearing shell of claim 1, wherein said the sliding layer additionally comprises 1 to 3% by weight of Al.

5. The connecting rod bearing shell or bushing or main bearing shell of claim 1, wherein an iron content is 3.5 to 4.5% by weight thereof.

* * * * *